(12) United States Patent
Mehta et al.

(10) Patent No.: US 8,263,254 B2
(45) Date of Patent: Sep. 11, 2012

(54) CELL WITH AN OUTER LAYER OF INTUMESCENT MATERIAL

(75) Inventors: Vineet Haresh Mehta, Mountain View, CA (US); Alex Prilutsky, San Mateo, CA (US); Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 359 days.

(21) Appl. No.: 12/769,737

(22) Filed: Apr. 29, 2010

(65) Prior Publication Data

US 2011/0014514 A1 Jan. 20, 2011

Related U.S. Application Data

(63) Continuation-in-part of application No. 12/460,423, filed on Jul. 17, 2009, now Pat. No. 7,736,799, which is a continuation of application No. 12/504,712, filed on Jul. 17, 2009, now Pat. No. 7,749,647.

(51) Int. Cl.
*H01M 2/00* (2006.01)
*H01M 2/02* (2006.01)

(52) U.S. Cl. ......... 429/176; 429/120; 429/163; 429/177

(58) Field of Classification Search .................. 429/120, 429/148, 176–178, 163
See application file for complete search history.

(56) References Cited

U.S. PATENT DOCUMENTS

| 4,137,376 A | 1/1979 | Clegg et al. |
| 4,483,908 A | 11/1984 | Zimmerman |
| 6,127,064 A | 10/2000 | Shibata et al. |
| 6,146,785 A | 11/2000 | Rigobert et al. |
| 6,682,847 B2 | 1/2004 | Inoue et al. |
| 6,706,446 B2 | 3/2004 | Nakai et al. |

FOREIGN PATENT DOCUMENTS

| EP | 807984 A1 | 11/1997 |
| JP | 2002298793 A | 10/2002 |

OTHER PUBLICATIONS

Berdichevsky et al., The Tesla Roadster Battery System, http://www.teslamotors.com/display_data/TeslaRoadsterBatterySystem.pdf, Aug. 16, 2006, pp. 1-5.

*Primary Examiner* — Gregg Cantelmo
(74) *Attorney, Agent, or Firm* — Patent Law Office of David G. Beck

(57) ABSTRACT

A battery assembly is provided that includes a layer of intumescent material that coats the sidewall and bottom surface of the cell casing, excluding at least one case contact region.

17 Claims, 4 Drawing Sheets

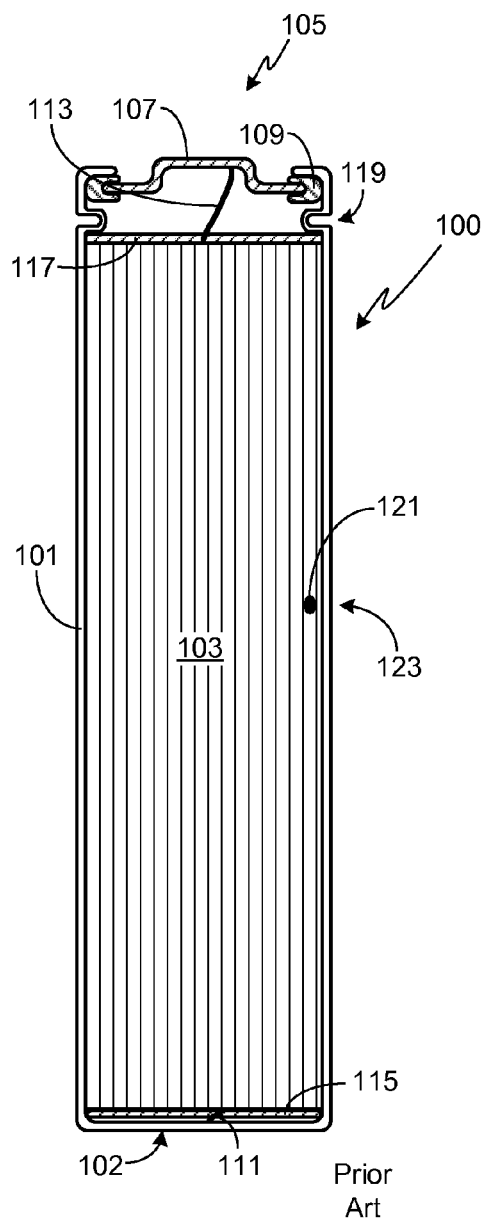
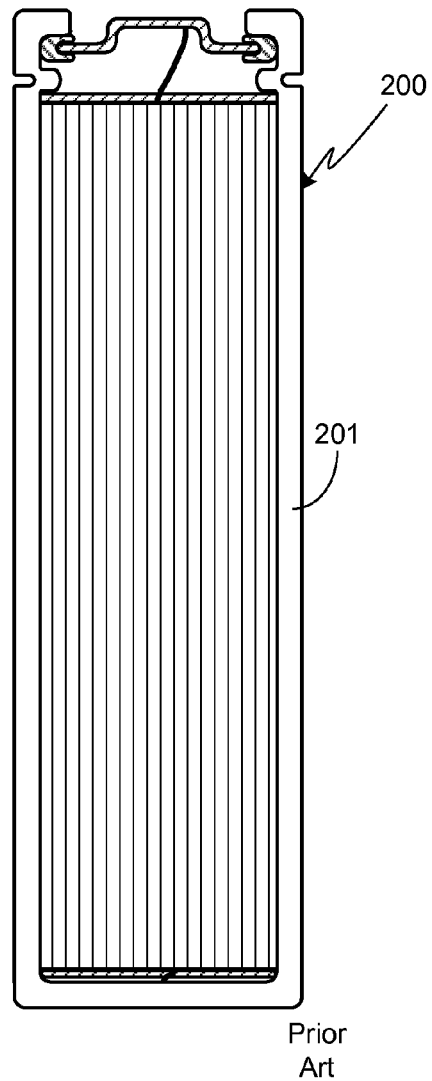
FIG. 1
FIG. 2

CELL WITH AN OUTER LAYER OF INTUMESCENT MATERIAL

CROSS-REFERENCES TO RELATED APPLICATIONS

This application is a continuation-in-part of U.S. patent application Ser. No. 12/460,423, filed Jul. 17, 2009, now U.S. Pat. No. 7,736,799, which is a continuation of U.S. patent application Ser. No. 12/504,712, filed Jul. 17, 2009, now U.S. Pat. No. 7,749,647, the disclosures of which are incorporated herein by reference for any and all purposes.

FIELD OF THE INVENTION

The present invention relates generally to batteries, and more particularly, to a means for maintaining cell wall integrity during thermal runaway.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage and, in some circumstances, bodily harm or loss of life. When a battery undergoes thermal runaway, it typically emits a large quantity of smoke, jets of flaming liquid electrolyte, and sufficient heat to lead to the combustion and destruction of materials in close proximity to the cell. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of a battery within an unattended laptop will likely result in not only the destruction of the laptop, but also at least partial destruction of its surroundings, e.g., home, office, car, laboratory, etc. If the laptop is on-board an aircraft, for example within the cargo hold or a luggage compartment, the ensuing smoke and fire may lead to an emergency landing or, under more dire conditions, a crash landing. Similarly, the thermal runaway of one or more batteries within the battery pack of a hybrid or electric vehicle may destroy not only the car, but may lead to a car wreck if the car is being driven or the destruction of its surroundings if the car is parked.

One approach to overcoming this problem is by reducing the risk of thermal runaway. For example, to prevent batteries from being shorted out during storage and/or handling, precautions can be taken to ensure that batteries are properly stored, for example by insulating the battery terminals and using specifically designed battery storage containers. Another approach to overcoming the thermal runaway problem is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes. Although this research may lead to improved cell chemistries and cell designs, currently this research is only expected to reduce, not eliminate, the possibility of thermal runaway.

FIG. 1 is a simplified cross-sectional view of a conventional battery 100, for example a lithium ion battery utilizing the 18650 form-factor. Battery 100 includes a cylindrical case 101, an electrode assembly 103, and a cap assembly 105. Case 101 is typically made of a metal, such as nickel-plated steel, that has been selected such that it will not react with the battery materials, e.g., the electrolyte, electrode assembly, etc. Typically cell casing 101 is fabricated in such a way that the bottom surface 102 is integrated into the case, resulting in a seamless lower cell casing. The open end of cell case 101 is sealed by a cap assembly 105, assembly 105 including a battery terminal 107, e.g., the positive terminal, and an insulator 109, insulator 109 preventing terminal 107 from making electrical contact with case 101. Although not shown, a typical cap assembly will also include an internal positive temperature coefficient (PTC) current limiting device, a current interrupt device (CID), and a venting mechanism, the venting mechanism designed to rupture at high pressures and provide a pathway for cell contents to escape. Additionally, cap assembly 105 may contain other seals and elements depending upon the selected design/configuration.

Electrode assembly 103 is comprised of an anode sheet, a cathode sheet and an interposed separator, wound together in a spiral pattern often referred to as a jellyroll'. An anode electrode tab 111 connects the anode electrode of the wound electrode assembly to the negative terminal while a cathode tab 113 connects the cathode electrode of the wound electrode assembly to the positive terminal. In the illustrated embodiment, the negative terminal is case 101 and the positive terminal is terminal 107. In most configurations, battery 100 also includes a pair of insulators 115/117. Case 101 includes a crimped portion 119 that is designed to help hold the internal elements, e.g., seals, electrode assembly, etc., in place.

In a conventional cell, such as the cell shown in FIG. 1, a variety of different abusive operating/charging conditions and/or manufacturing defects may cause the cell to enter into thermal runaway, where the amount of internally generated heat is greater than that which can be effectively withdrawn. As a result, a large amount of thermal energy is rapidly released, heating the entire cell up to a temperature of 900° C. or more and causing the formation of localized hot spots where the temperature may exceed 1500° C. Accompanying this energy release is the release of gas, causing the gas pressure within the cell to increase.

To combat the effects of thermal runaway, a conventional cell will typically include a venting element within the cap assembly. The purpose of the venting element is to release, in a somewhat controlled fashion, the gas generated during the thermal runaway event, thereby preventing the internal gas pressure of the cell from exceeding its predetermined operating range.

While the venting element of a cell may prevent excessive internal pressure, this element may have little effect on the thermal aspects of a thermal runaway event. For example, if a local hot spot occurs in cell 100 at a location 121, the thermal energy released at this spot may be sufficient to heat the adjacent area 123 of the single layer casing wall 101 to above its melting point. Even if the temperature of area 123 is not increased beyond its melting point, the temperature of area 123 in concert with the increased internal cell pressure may quickly lead to the casing wall being perforated at this location. Once perforated, the elevated internal cell pressure will cause additional hot gas to be directed to this location, further compromising the cell at this and adjoining locations.

It should be noted that when a cell undergoes thermal runaway and vents in a controlled fashion using the intended venting element, the cell wall may still perforate due to the size of the vent, the material characteristics of the cell wall, and the flow of hot gas traveling along the cell wall as it rushes towards the ruptured vent. Once the cell wall is compromised, i.e., perforated, collateral damage can quickly escalate, due both to the unpredictable location of such a hot spot and due to the unpredictable manner in which such cell wall perforations grow and affect neighboring cells. For example, if the cell is one of a large array of cells comprising a battery pack, the jet of hot gas escaping the cell perforation may heat the adjacent cell to above its critical temperature, causing the adjacent cell to enter into thermal runaway. Accordingly, it will be appreciated that the perforation of the wall of one cell during thermal runaway can initiate a cascading reaction that can spread throughout the battery pack. Furthermore, even if the jet of hot gas escaping the cell perforation from the first cell does not initiate thermal runaway in the adjacent cell, it may still affect the health of the adjacent cell, for example by weakening the adjacent cell wall, thereby making the adjacent cell more susceptible to future failure.

As previously noted, cell perforations are due to localized, transient hot spots where hot, pressurized gas from a concentrated thermal event is flowing near the inner surface of the cell. Whether or not a cell transient hot spot perforates the cell wall or simply dissipates and leaves the cell casing intact depends on a number of factors. These factors can be divided into two groups; those that are based on the characteristics of the thermal event and those that are based on the physical qualities of the cell casing. Factors within the first group include the size and temperature of the hot spot as well as the duration of the thermal event and the amount of gas generated by the event. Factors within the second group include the wall thickness as well as the casing's yield strength as a function of temperature, heat capacity and thermal conductivity.

FIG. 2 illustrates the conventional approach to improving the failure resistance of a cell, where failure is defined as a thermally induced wall perforation. As shown, in cell 200 the thickness of casing 201 has been significantly increased, thereby improving the cell's failure resistance at the expense of cell weight. Assuming that cell mass is not an issue, which it is not for many consumer applications where only a few cells are used, the conventional approach to preventing wall perforations during thermal runaway is quite effective.

Unfortunately, for those applications in which the battery pack may include hundreds or even thousands of cells, for example the battery pack of an electric vehicle, the added mass of this approach is very unattractive since performance is directly tied to mass. For instance, if the conventional approach only adds 4 grams per cell, for a battery pack with 10,000 cells, this increase adds up to 40 kg. Accordingly, for these applications, the conventional approach to improving cell failure resistance is unacceptable and an improved means for maintaining cell integrity during thermal runaway is needed. The present invention provides such a means.

SUMMARY OF THE INVENTION

The present invention provides a battery assembly that limits the effects of thermal runaway as well as inhibiting the propagation of the initial thermal event to adjacent cells. The provided battery assembly includes a layer of intumescent material that coats the sidewall and bottom surface of the cell casing, excluding a case contact region located near the cell's cap assembly. In at least one embodiment, the layer of intumescent material excludes a second case contact region located near the bottom surface of the cell. One, or both, case contact regions may be ring-shaped and configured to extend around the circumference of the cell casing. The intumescent material may be comprised of graphite-based intumescent materials, thermoplastic elastomers, ceramic-based intumescent materials, vermiculite/mineral fiber based intumescent materials, and ammonium polyphosphate based intumescent materials. The intumescent material may have a SET temperature in the range of 75° C. to 150° C.; in the range of 100° C. to 200° C.; in the range of 100° C. to 300° C.; or in the range of 200° C. to 300° C. Preferably the intumescent material is biologically inert and electrically non-conductive.

A further understanding of the nature and advantages of the present invention may be realized by reference to the remaining portions of the specification and the drawings.

BRIEF DESCRIPTION OF THE DRAWINGS

FIG. 1 is a simplified cross-sectional illustration of a cell utilizing the 18650 form-factor;

FIG. 2 illustrates the cell shown in FIG. 1, modified to increase failure resistance in accordance with the prior art approach;

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale.

Throughout the following specification, the invention is described relative to cells using the 18650 form-factor. It should be understood, however, that the invention may also be applied to other cell designs, shapes, chemistries, form-factors and configurations while retaining the functionality of the present invention. For example, the application is equally applicable to prismatic and pouch cells.

The present inventors recognize the weight constraints placed on the batteries within a large battery pack and the factors that contribute to the initiation and growth of wall perforations during thermal runaway. Additionally, the present inventors recognize that once a cell enters into thermal runaway it is no longer viable. Accordingly, at this point the primary goal is to reduce the risk of the thermal runaway event affecting neighboring cells, potentially leading to the initiation of a cascading thermal runaway event. In recognition of these design parameters and goals, the intent of the present invention is to minimize the effects of thermal runaway on cells that are adjacent to the affected cell, thereby resisting thermal runaway propagation.

Figure 3:
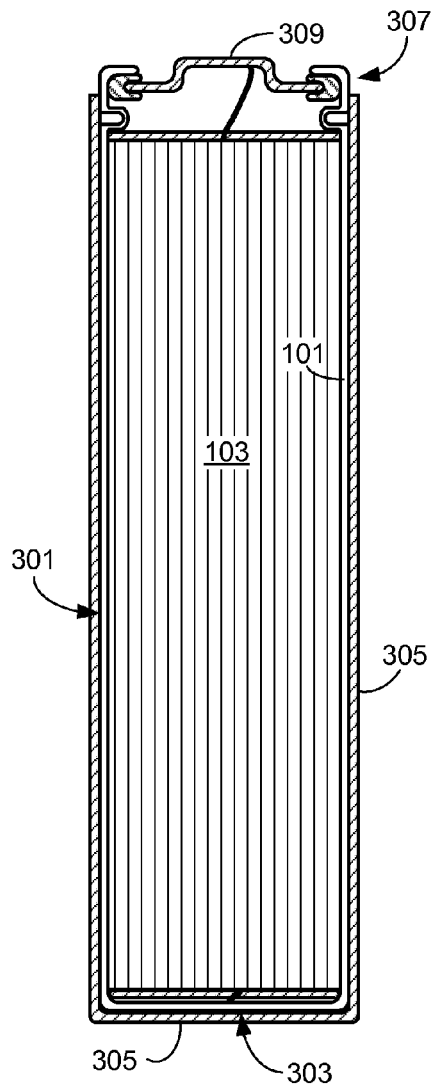
FIG. 3 illustrates a preferred embodiment of the invention.

FIG. 3 illustrates a preferred embodiment of the invention in which the outer surface of the cell case is coated with a layer of an intumescent material. More specifically and as illustrated, both the sidewalls 301 and the bottom surface 303 of cell case 101 are covered by layer 305 of intumescent material. Preferably the intumescent material layer 305 covering the cell's sidewalls 301 and bottom surface 303 is formed as a single, continuous layer as shown. Such a single, continuous layer may be formed, for example, by dipping or painting the cell with a solution of the intumescent material during a single coating operation. As shown in the illustration, an upper region 307 of cell sidewall 301 is left uncoated by intumescent layer 305, thus allowing electrical contact to be made to the cell via this region. The second cell terminal 309 is also shown in this illustration. Preferably region 307 is in the form of a ring that extends around the circumference of the cell case as shown. Preferably the width of region 307, measured from the top of the cell casing, is less than 5 millimeters, more preferably between 2 and 4 millimeters, and still more preferably between 2 and 3 millimeters. In at least one embodiment of the invention region 307 is formed during the application of the intumescent material simply by leaving this region uncoated. Alternately, region 307 may be initially coated/covered with a protective layer that can be easily removed after application of the intumescent material, leaving this region of the cell casing bare.

The use of contact region 307 has several advantages over the prior art. First, it simplifies forming the electrical connections to the cell since both cell interconnects are attached to, or near, the top of the cell. Second, as both interconnects are formed at, or near, the top of the cell, a variety of means (e.g., potting compounds, adhesives, brackets, etc.) may be used to mount the cell within a battery pack without interfering with the cell interconnects. Third, as a result of using a ring contact region 307, as preferred, the cell is insensitive to cell orientation, i.e., the cell may be rotated within the mounting bracket/battery pack without affecting the positioning of the cell interconnects applied to either region 307 or terminal 309. Fourth, application of intumescent layer 305 is simplified since the cell case contact is not formed through the intumescent layer, rather it (i.e., region 307) is separate from the intumescent layer. Fifth, as region 307 is located at the top of the cell and above crimp 119, the region of the cell casing that is uncoated with intumescent material is less susceptible to the formation of hot spots as it lies above electrode assembly 103, and therefore the lack of intumescent material in this region is not critical.

Figure 4:
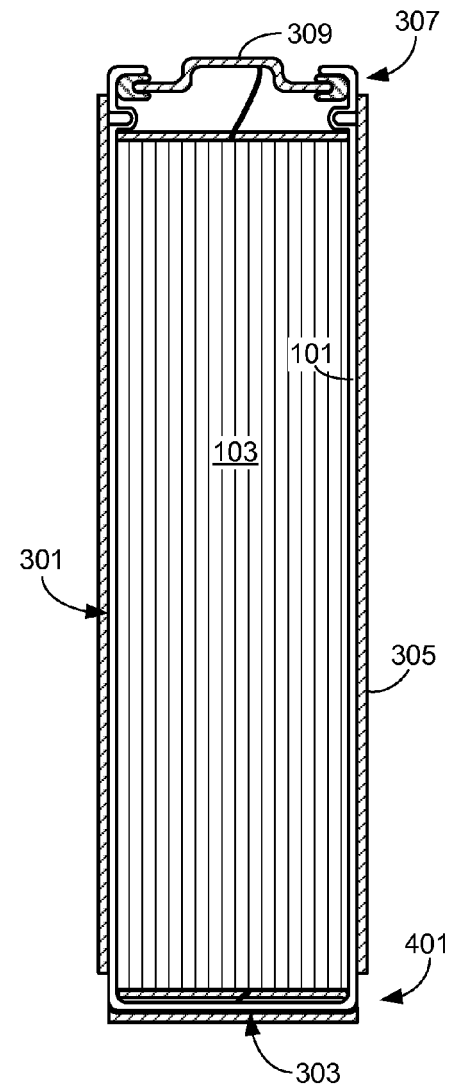
FIG. 4 illustrates an alternate preferred embodiment of the invention.

In an alternate embodiment of the invention, illustrated in FIG. 4, a second region 401 of the cell casing sidewall is left uncoated. Preferably the second region is located in the lower region of the cell sidewall as shown. Region 401 provides a second location for mounting hardware or potting compounds, etc. to firmly and directly grasp the cell casing without potential interference from the intumescent coating. Preferably region 401 is in the form of a ring that extends around the circumference of the cell case as shown. Preferably the width of region 401, measured from the bottom of the cell casing, is less than 5 millimeters, more preferably between 2 and 4 millimeters, and still more preferably between 2 and 3 millimeters. Typically region 401 is formed using the same process as that employed to form region 307. In at least one application envisioned by the inventors, the cell only includes region 401, not both regions 307 and 401. In this application electrical contact is made via region 401, rather than region 307.

The inventors have found that during expansion of the intumescent material, the stress at the interface between the cell casing and the intumescent material may cause the coating to break-off, or flake-off, of the cell surface. Accordingly, in a preferred embodiment of the invention the outer surfaces of the cell casing, i.e., surfaces 301 and 303, are roughened prior to application of the intumescent material, thereby achieving stronger adhesion between the cell casing and the intumescent layer. The surfaces may be roughened using any of a variety of well known techniques. Preferably the average surface roughness, Ra, of these surfaces after preparation, but before intumescent coating, is in the range of 20 to 100 micrometers.

During thermal runaway, the exterior surface of the battery heats up, this heating process typically initiating at one or more transient hot spots (e.g., spot 121 in FIG. 1). During this process, intumescent layer 305 absorbs the excess heat via an endothermic chemical reaction. Once the intumescent material's activation temperature is reached, also referred to as the material's start expansion temperature or "SET", layer 305 will begin to expand. Typically material expansion begins near the transient hot spots, and then continues as the entire battery heats up past the SET temperature. After expansion, the intumescent material of layer 305 hardens to what is commonly referred to as a char.

The inventors have found that the use of an intumescent material applied directly to a cell as described above provides significant resistance to the propagation of a thermal runaway event. In general, the intumescent material performs several functions when a cell begins to overheat. First, the intumescent material surrounding the cell absorbs the thermal energy generated during the thermal event, thereby helping to prevent a transient hot spot (e.g., spot 121 in FIG. 1) from perforating the cell casing by giving the cell sufficient time to reach thermal equilibrium. Second, once the SET temperature is reached, the intumescent material expands and provides a thermal barrier between the affected cell and neighboring cells. Third, once the intumescent material hardens into char, it helps to contain the affected cell, for example by preventing escaping gas or flames from impinging directly on an adjacent cell. Fourth, in some applications the intumescent material may be used to direct excess heat produced by an affected cell towards a heat removal means, such as a coolant conduit.

Figure 5:
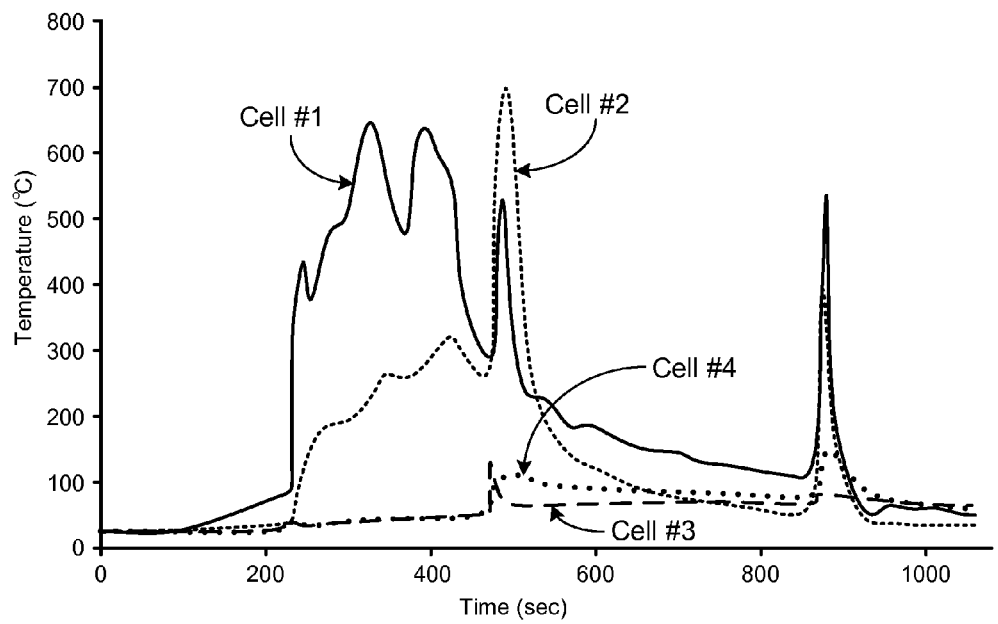
FIG. 5 graphically illustrates propagation of a thermal runaway event among a series of uncoated cells.
Figure 6:
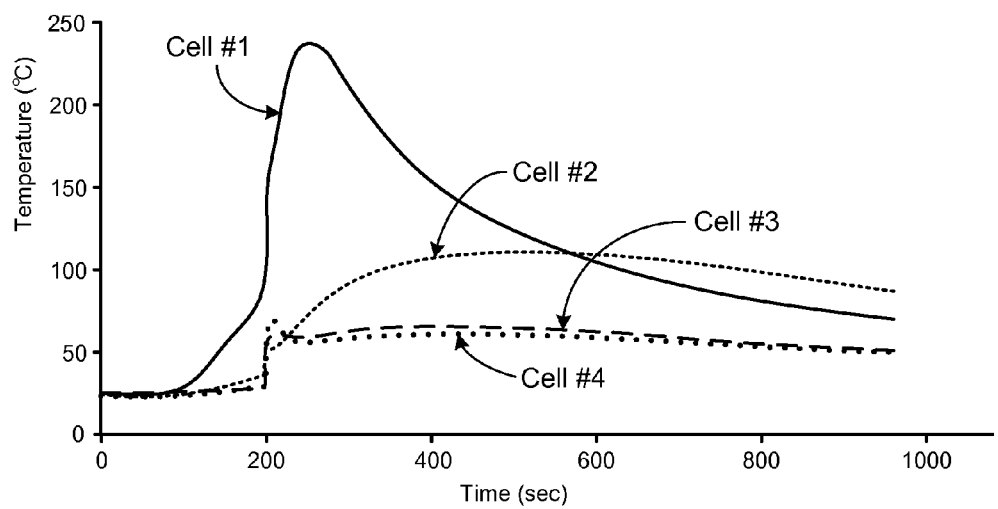
FIG. 6 graphically illustrates the non-propagation of a thermal runaway event among a series of cells coated with intumescent material.

In one test designed to determine the effects of applying an intumescent coating to the outer casing of a cell, two groups of cells were arranged in series. The first group of cells were untreated while each cell of the second group of cells had intumescent material applied to the outer cell casing. The cell-to-cell spacing was the same for both tests. In each test, the first cell of the group was forced into a thermal runaway event. The results of this test for the untreated cells, illustrated in FIG. 5, showed that within 3 to 4 minutes of the first cell undergoing thermal runaway, the next cell in line entered into thermal runaway. In contrast, and as shown in FIG. 6, the thermal runaway event did not propagate between adjacent cells for the intumescent coated cells. Additionally, FIG. 5 illustrates that uncoated cells will often undergo multiple thermal spikes as transient hot spots are formed at different locations within the cell, these transient hot spots clearly affecting neighboring cells. In the intumescent material coated cells, however, the thermal barrier created by the intumescent material prevents neighboring cells from being subjected to multiple thermal peaks. Rather, the external temperature presented to the neighboring cells in the intumescent coated group of cells peaks once, followed by a gradual dissipation of thermal energy until thermal equilibrium is reached. Note that the differences in the monitored temperatures, as reported in FIGS. 5 and 6, are due to the intumescent coating presenting a thermal barrier between the cell casing and the thermocouple.

Figure 7:
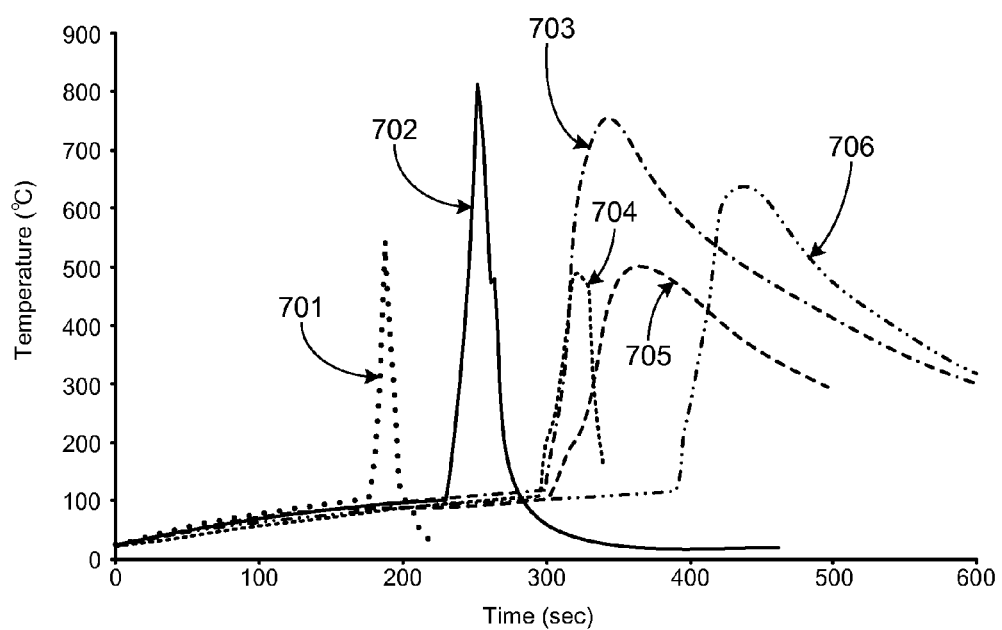
FIG. 7 graphically illustrates the ability of intumescent material to absorb thermal energy, thereby delaying the onset of thermal runaway.

As noted above, one of the benefits of the intumescent coating is its ability to absorb some of the thermal energy generated during a thermal event. By absorbing some of this energy, the onset of thermal runaway may be prevented, or at a minimum, delayed. FIG. 7 illustrates this aspect of the intumescent coating. Specifically, six cells were driven into thermal runaway, two of the cells being uncoated (i.e., curves 701 and 702) and four of the cells being coated with intumescent material (i.e., curves 703-706). While the same conditions were applied to each cell, thermal runaway for the coated cells was delayed by a minimum of 100 seconds, and in some cases up to several minutes.

The intumescent layers of the present invention, e.g., layer 305, may be fabricated from any of a variety of intumescent materials, for example, graphite-based intumescent material (e.g., expandable graphite in a polymeric binder), thermoplastic elastomers, ceramic-based intumescent material, vermiculite/mineral fiber based intumescent material, and ammonium polyphosphate based intumescent material. Preferably the selected intumescent material has a SET temperature in the range of 100° C. to 300° C., and more preferably in the range of 200° C. to 300° C. Alternately, the selected intumescent material may have a SET temperature in the range of 100° C. to 200° C., or in the range of 75° C. to 150° C. Preferably the selected intumescent material is biologically inert, thus insuring that if the intumescent covered cell is used in an application with limited airflow, the layer's activation will be a non-toxic event. Additionally, it is preferable that the selected intumescent material be comprised of a non-electrically conductive material.

In some applications, e.g., electric vehicles, the batteries within the battery pack are cooled using an active cooling system. The active cooling system may be comprised, for example, of one or more conduits mounted in close proximity to, or in contact with, the batteries within the battery pack. By pumping coolant through the conduits, heat is withdrawn from the batteries/battery pack. In such applications, the inventors have found that it is preferable to leave the portion of the cell case in proximity to, or in contact with, the cooling conduit free of the intumescent material. By keeping this portion of the cell uncoated, heat is more effectively withdrawn from the batteries. It should be understood that the previously described embodiments shown in FIGS. 3 and 4 may be modified so that the layer of intumescent material does not completely cover the portion of cell case 101 in proximity to, or in contact with, the cooling conduit.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery assembly, comprising:
   a battery, said battery comprising:
      a cell case comprising an outer sidewall surface, a first end portion and a second end portion, wherein said first end portion is comprised of a cell case bottom with an outer bottom surface, and wherein said second end portion is comprised of a central open portion;
      an electrode assembly contained within said cell case, wherein a first electrode of said electrode assembly is electrically connected to said cell case; and
      a cap assembly mounted to said cell case, said cap assembly closing said central open portion of said second end portion, wherein said cap assembly further comprises a battery terminal electrically isolated from said cell case and electrically connected to a second electrode of said electrode assembly; and
   a layer of an intumescent material coating said outer bottom surface and said outer sidewall surface except for a case contact region of said outer sidewall surface of said cell case, wherein said case contact region is located within said second end portion of said outer sidewall surface of said cell case, wherein said case contact region is proximate to an end surface of said second end portion of said cell case.

2. The battery assembly of claim 1, wherein said case contact region is ring-shaped and extends around the entire circumference of said cell case.

3. The battery assembly of claim 2, wherein said ring-shaped case contact region is positioned between said end surface of said second end portion of said cell case and a cell case crimp.

4. The battery assembly of claim 1, wherein said case contact region has a width of less than 5 millimeters.

5. The battery assembly of claim 1, wherein said case contact region has a width of between 2 and 3 millimeters.

6. The battery assembly of claim 1, wherein a second case contact region of said outer sidewall surface of said cell case is uncoated by said layer of said intumescent material, wherein said second case contact region is located within said first end portion of said outer sidewall surface of said cell case, and wherein said case contact region is proximate to said outer bottom surface.

7. The battery assembly of claim 6, wherein said second case contact region is ring-shaped and extends around the entire circumference of said cell case.

8. The battery assembly of claim 6, wherein said second case contact region has a width of less than 5 millimeters.

9. The battery assembly of claim 6, wherein said second case contact region has a width of between 2 and 3 millimeters.

10. The battery assembly of claim 1, wherein said battery has an 18650 form-factor.

11. The battery assembly of claim 1, wherein said intumescent material is selected from the group of intumescent materials consisting of graphite-based intumescent materials, thermoplastic elastomers, ceramic-based intumescent materials, vermiculite/mineral fiber based intumescent materials, and ammonium polyphosphate based intumescent materials.

12. The battery assembly of claim 1, wherein said intumescent material has a start expansion temperature in the range of 75° C. to 150° C.

13. The battery assembly of claim 1, wherein said intumescent material has a start expansion temperature in the range of 100° C. to 200° C.

14. The battery assembly of claim 1, wherein said intumescent material has a start expansion temperature in the range of 100° C. to 300° C.

15. The battery assembly of claim 1, wherein said intumescent material has a start expansion temperature in the range of 200° C. to 300° C.

16. The battery assembly of claim 1, wherein said intumescent material is biologically inert.

17. The battery assembly of claim 1, wherein said intumescent material is electrically non-conductive.

* * * * *